(12) United States Patent
Xie et al.

(10) Patent No.: US 12,089,213 B2
(45) Date of Patent: Sep. 10, 2024

(54) COMMUNICATIONS METHOD AND APPARATUS FOR ENSURING CORRECT TRANSMISSION OF A PUSCH

(71) Applicant: HUAWEI TECHNOLOGIES CO., LTD., Shenzhen (CN)

(72) Inventors: Xinqian Xie, Beijing (CN); Zhiheng Guo, Beijing (CN); Yongqiang Fei, Shenzhen (CN); Wenping Bi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 713 days.

(21) Appl. No.: 17/166,188

(22) Filed: Feb. 3, 2021

(65) Prior Publication Data

US 2021/0160859 A1    May 27, 2021

Related U.S. Application Data

(63) Continuation of application No. PCT/CN2019/099493, filed on Aug. 6, 2019.

(30) Foreign Application Priority Data

Aug. 7, 2018    (CN) .......................... 201810893348.6

(51) Int. Cl.
   *H04W 72/21*      (2023.01)
   *H04L 5/14*       (2006.01)
   *H04W 72/56*      (2023.01)

(52) U.S. Cl.
   CPC ........... *H04W 72/21* (2023.01); *H04L 5/1469* (2013.01); *H04W 72/56* (2023.01)

(58) Field of Classification Search
   CPC ............................ H04W 72/21; H04W 72/56
   See application file for complete search history.

(56) References Cited

U.S. PATENT DOCUMENTS

2014/0369324 A1* 12/2014 Lin ................... H04W 56/0005
                                                    370/336
2021/0194638 A1*  6/2021 Beale ...................... H04L 5/006

FOREIGN PATENT DOCUMENTS

CN          102377537 A     3/2012
CN          102594527 A     7/2012
(Continued)

OTHER PUBLICATIONS

LG Electronics, "Remaining details on UL sharing between LTE and NR", 3GPP TSG RAN WG1 Meeting Ad-Hoc R1-1710354,Qingdao, P.R. ChinaJun. 27-30, 2017, Total 6 Pages.

(Continued)

*Primary Examiner* — Won Tae C Kim
(74) *Attorney, Agent, or Firm* — Rimon PC

(57) ABSTRACT

Embodiments of this application disclose a communications method and apparatus. The method may include: determining, by a terminal device, a first signal to be sent on a first uplink carrier in a first time period, and determining a second signal to be sent on a second uplink carrier in a second time period, where when a first reference signal configuration manner is used for the second signal, a priority of the second signal is higher than a priority of the first signal, and the terminal device determines that a first symbol in the first signal is to be discarded; and the terminal device sends another symbol in the first signal other than the first symbol and the second signal to a network device, where the first time period and the second time period are adjacent in terms of time, and the second signal is a PUSCH.

9 Claims, 8 Drawing Sheets

(56) References Cited

FOREIGN PATENT DOCUMENTS

| CN | 105812105 A | 7/2016 |
|----|-------------|--------|
| CN | 108029032 A | 5/2018 |
| CN | 105532048 B | 9/2019 |
| WO | 2017077694 A1 | 5/2017 |
| WO | 2018054305 A1 | 3/2018 |

OTHER PUBLICATIONS

Chinese Office Action for Application No. 201810893348.6 dated Jul. 10, 2020.

* cited by examiner

COMMUNICATIONS METHOD AND APPARATUS FOR ENSURING CORRECT TRANSMISSION OF A PUSCH

CROSS-REFERENCE TO RELATED APPLICATIONS

This application is a continuation of International Application No. PCT/CN2019/099493, filed on Aug. 6, 2019, which claims priority to Chinese Patent Application No. 201810893348.6, filed on Aug. 7, 2018. The disclosures of the aforementioned applications are hereby incorporated by reference in their entireties.

TECHNICAL FIELD

This application relates to the field of communications technologies, and in particular, to a communications method and apparatus.

BACKGROUND

In a 5G new radio (NR) technology, in addition to using a time division duplex (TDD) carrier to perform uplink and downlink communication, a terminal device and a network device may further use a plurality of additional uplink carriers to perform uplink communication. The additional uplink carrier is usually referred to as a supplementary uplink (SUL) carrier, and a carrier frequency of the SUL carrier is not equal to a frequency of the TDD carrier. To be specific, there may be a plurality of available uplink carriers for uplink communication between the terminal device and the network device, and the plurality of uplink carriers correspond to one downlink carrier.

In the prior art, considering factors such as a capability and a transmit power of the terminal device, the terminal device sends an uplink signal to the network device on only one of the plurality of uplink carriers in a same time period. This may also be referred to as uplink single transmission. However, the terminal device may switch between different uplink carriers. For example, the terminal device sends the uplink signal on the TDD carrier in a first time period, and sends the uplink signal on the SUL carrier in a second time period. When the terminal device switches between the different uplink carriers, if the terminal device uses a same radio frequency loop on two uplink carriers, and a frequency difference between the two uplink carriers is relatively large, the terminal device needs a switching time to implement switching between the two uplink carriers. Usually, the terminal device discards the last one or more symbols on a previous carrier, or discards the first one or the first several symbols on a next carrier, so that adjustment of a working frequency of the radio frequency loop can be completed within a time occupied by the discarded symbol. If the first one or the first several symbols on the next carrier are discarded, an uplink signal on the next carrier is a physical uplink shared channel (PUSCH), and a demodulation reference signal (DMRS) is configured on the $1^{st}$ symbol on the PUSCH, the DMRS is to be discarded. Consequently, the network device cannot receive the DMRS, channel estimation cannot be performed, and therefore, the PUSCH cannot be correctly demodulated. That is, transmission of the PUSCH fails.

SUMMARY

Embodiments of this application provide a communications method and apparatus, to prevent a DMRS from being discarded when switching is performed between different uplink carriers, and ensure that a PUSCH can be correctly transmitted.

To achieve the foregoing objective, the following technical solutions are used in the embodiments of this application.

According to a first aspect, this application provides a communications method.

In a possible design, the method may include: A terminal device determines a first signal to be sent on a first uplink carrier in a first time period, and determines a second signal to be sent on a second uplink carrier in a second time period, where when a first reference signal configuration manner is used for the second signal, a priority of the second signal is higher than a priority of the first signal, and the terminal device determines that a first symbol in the first signal is to be discarded; and the terminal device sends another symbol in the first signal other than the first symbol and the second signal to a network device, where the first time period and the second time period are adjacent in terms of time, and the second signal is a physical uplink shared channel PUSCH. In this implementation, the terminal device determines, based on the reference signal configuration manner, the symbol to be discarded, so that a DMRS can be prevented from being discarded, and it is ensured that the PUSCH can be correctly transmitted.

In a possible design, when a second reference signal configuration manner is used for the second signal, the priority of the first signal is higher than the priority of the second signal, and the terminal device determines that a second symbol in the second signal is to be discarded. In this implementation, the terminal device determines, based on the reference signal configuration manner, the symbol to be discarded, so that the DMRS can be prevented from being discarded, and it is ensured that the PUSCH can be correctly transmitted.

According to a second aspect, this application provides a communications method.

In a possible design, the method may include: A terminal device determines to send, when a first reference signal configuration manner is used for a second signal, another symbol in a first signal other than a first symbol and the second signal to a network device, where the first signal is a signal to be sent on a first uplink carrier in a first time period, the second signal is a signal to be sent on a second uplink carrier in a second time period, the first time period and the second time period are adjacent in terms of time, and the second signal is a physical uplink shared channel PUSCH. In this implementation, the terminal device sends an uplink signal based on the reference signal configuration manner, so that a DMRS can be prevented from being discarded, and it is ensured that the PUSCH can be correctly transmitted.

In a possible design, the terminal device determines to send, when a second reference signal configuration manner is used for the second signal, the first signal and another symbol in the second signal other than a second symbol to the network device. In this implementation, the terminal device sends the uplink signal based on the reference signal configuration manner, so that the DMRS can be prevented from being discarded, and it is ensured that the PUSCH can be correctly transmitted.

According to a third aspect, this application provides a communications method.

In a possible design, the method may include: A terminal device determines a first signal to be sent on a first uplink carrier in a first time period, and determines a second signal to be sent on a second uplink carrier in a second time period, where if the first time period is before the second time period, a priority of the second signal is higher than a priority of the first signal, and the terminal device determines that a first symbol in the first signal is to be discarded, and sends another symbol in the first signal other than the first symbol and the second signal to a network device; or if the first time period is after the second time period, a priority of the first signal is higher than a priority of the second signal, and the terminal device determines that a second symbol in the second signal is to be discarded, and sends the first signal and another symbol in the second signal other than the second symbol to a network device, where the first time period and the second time period are adjacent in terms of time, and the second signal is a physical uplink shared channel PUSCH. In this implementation, the terminal device determines, based on a sequence of the first time period and the second time period, the symbol to be discarded, so that a DMRS can be prevented from being discarded, and it is ensured that the PUSCH can be correctly transmitted.

According to a fourth aspect, this application provides a communications method.

In a possible design, the method may include: If determining that a first time period is before a second time period, a terminal device sends another symbol in a first signal other than a first symbol and a second signal to a network device; or if determining that a first time period is after a second time period, a terminal device sends a first signal and another symbol in a second signal other than a second symbol to a network device, where the first signal is a signal to be sent on a first uplink carrier in the first time period, the second signal is a signal to be sent on a second uplink carrier in the second time period, the first time period and the second time period are adjacent in terms of time, and the second signal is a physical uplink shared channel PUSCH. In this implementation, the terminal device sends an uplink signal based on a sequence of the first time period and the second time period, so that a DMRS can be prevented from being discarded, and it is ensured that the PUSCH can be correctly transmitted.

With reference to the third aspect and the fourth aspect, in a possible design, a first reference signal configuration manner is used for the second signal.

With reference to any one of the foregoing aspects, in a possible design, the first signal does not include acknowledgment feedback information.

With reference to any one of the foregoing aspects, in a possible design, when the second symbol in the second signal is discarded, if the second signal includes an additional demodulation reference signal, the second symbol is the $1^{st}$ symbol in the second signal, and the terminal device sends the first signal and another symbol in the second signal other than the $1^{st}$ symbol to the network device; or if the second signal includes no additional demodulation reference signal, the second symbol is all symbols in the second signal, and the terminal device sends the first signal to the network device.

With reference to any one of the foregoing aspects, in another possible design, when the second symbol in the second signal is discarded, if there is a potential terminal jointly scheduled with the terminal device, the second symbol is all symbols in the second signal, and the terminal device sends the first signal to the network device; or if there is no potential terminal jointly scheduled with the terminal device, the second symbol is the $1^{st}$ symbol in the second signal other than a demodulation reference signal, or is the last symbol in the second signal, and the terminal device sends the first signal and the another symbol in the second signal other than the second symbol to the network device.

Correspondingly, this application further provides a communications apparatus, and the apparatus may implement the communications method according to the first aspect, the second aspect, the third aspect, or the fourth aspect. For example, the apparatus may be a terminal device or a chip used in a terminal device, or may be another apparatus that can implement the foregoing communications method. The apparatus may implement the foregoing method by using software, hardware, or hardware executing corresponding software.

In a possible design, the apparatus may include a processor and a memory. The processor is configured to support the apparatus in performing a corresponding function in the method according to the first aspect, the second aspect, the third aspect and/or the fourth aspect. The memory is configured to couple to the processor, and store a program instruction and data that are for the apparatus. In addition, the apparatus may further include a communications interface, configured to support communication between the apparatus and another apparatus. The communications interface may be a transceiver or a transceiver circuit.

In a possible design, the apparatus may include a determining module and a sending module. The determining module is configured to determine a first signal to be sent on a first uplink carrier in a first time period, and determine a second signal to be sent on a second uplink carrier in a second time period, where the first time period and the second time period are adjacent in terms of time, and the second signal is a physical uplink shared channel PUSCH; the determining module is further configured to determine, when a first reference signal configuration manner is used for the second signal, that a first symbol in the first signal is to be discarded, where a priority of the second signal is higher than a priority of the first signal; and the sending module is configured to send another symbol in the first signal other than the first symbol and the second signal to a network device.

In a possible design, the determining module is further configured to determine, when a second reference signal configuration manner is used for the second signal, that a second symbol in the second signal is to be discarded, where the priority of the first signal is higher than the priority of the second signal.

In a possible design, the apparatus may include a determining module and a sending module. The determining module is configured to determine a reference signal configuration manner for a second signal; and the sending module is configured to send, when the determining module determines that a first reference signal configuration manner is used for the second signal, another symbol in a first signal other than a first symbol and the second signal to a network device, where the first signal is a signal to be sent on a first uplink carrier in a first time period, the second signal is a signal to be sent on a second uplink carrier in a second time period, the first time period and the second time period are adjacent in terms of time, and the second signal is a physical uplink shared channel PUSCH.

In a possible design, the sending module is configured to send, when the determining module determines that a second reference signal configuration manner is used for the second signal, the first signal and another symbol in the second signal other than a second symbol to the network device.

In another possible design, the apparatus may include a determining module and a sending module. The determining module is configured to determine a first signal to be sent on a first uplink carrier in a first time period, and determine a second signal to be sent on a second uplink carrier in a second time period, where the first time period and the second time period are adjacent in terms of time, and the second signal is a physical uplink shared channel PUSCH; the determining module is further configured to determine, when the first time period is before the second time period, that a first symbol in the first signal is to be discarded, where a priority of the second signal is higher than a priority of the first signal; the sending module is configured to send, when the first time period is before the second time period, another symbol in the first signal other than the first symbol and the second signal to a network device; the determining module is further configured to determine, when the first time period is after the second time period, that a second symbol in the second signal is to be discarded, where the priority of the first signal is higher than the priority of the second signal; and the sending module is configured to send, when the first time period is after the second time period, the first signal and another symbol in the second signal other than the second symbol to the network device.

In a possible design, the apparatus may include a determining module and a sending module. The determining module is configured to determine a sequence of a first time period and a second time period; the sending module is configured to send, if the determining module determines that the first time period is before the second time period, another symbol in a first signal other than a first symbol and a second signal to a network device; and the sending module is further configured to send, if the determining module determines that the first time period is after the second time period, the first signal and another symbol in the second signal other than a second symbol to the network device, where the first signal is a signal to be sent on a first uplink carrier in the first time period, the second signal is a signal to be sent on a second uplink carrier in the second time period, the first time period and the second time period are adjacent in terms of time, and the second signal is a physical uplink shared channel PUSCH.

In a possible design, a first reference signal configuration manner is used for the second signal.

In a possible design, the first signal does not include acknowledgment feedback information.

In a possible design, when the second symbol in the second signal is discarded, if the second signal includes an additional demodulation reference signal, the second symbol is the $1^{st}$ symbol in the second signal, and the sending module is specifically configured to send the first signal and another symbol in the second signal other than the $1^{st}$ symbol to the network device; or if the second signal includes no additional demodulation reference signal, the second symbol is all symbols in the second signal, and the sending module is specifically configured to send the first signal to the network device.

In a possible design, when the second symbol in the second signal is discarded, if there is a potential terminal jointly scheduled with a terminal device, the second symbol is all symbols in the second signal, and the sending module is specifically configured to send the first signal to the network device; or if there is no potential terminal jointly scheduled with a terminal device, the second symbol is the 1st symbol in the second signal other than a demodulation reference signal, or is the last symbol in the second signal, and the sending module is specifically configured to send the first signal and the another symbol in the second signal other than the second symbol to the network device.

According to a fifth aspect, this application provides a communications method.

In a possible design, the method may include: A network device sends first indication information and second indication information to a terminal device, where the first indication information indicates the terminal device to send a first signal on a first uplink carrier in a first time period, and the second indication information indicates the terminal device to send a second signal on a second uplink carrier in a second time period; when a first reference signal configuration manner is used for the second signal, a priority of the second signal is higher than a priority of the first signal; and the network device receives another symbol in the first signal other than a first symbol on the first uplink carrier in the first time period, and receives the second signal on the second uplink carrier in the second time period, where the first time period and the second time period are adjacent in terms of time, and the second signal is a physical uplink shared channel PUSCH. In this implementation, the network device determines a manner of receiving an uplink signal based on the reference signal configuration manner. The manner may be consistent with a manner of sending the uplink signal on the terminal device side. In this way, a DMRS is not discarded in the received uplink signal, and it is ensured that the PUSCH can be correctly transmitted.

In a possible design, when a second reference signal configuration manner is used for the second signal, a priority of the first signal is higher than a priority of the second signal; and the network device receives the first signal on the first uplink carrier in the first time period, and receives another symbol in the second signal other than a second symbol on the second uplink carrier in the second time period. In this implementation, the network device determines the manner of receiving the uplink signal based on the reference signal configuration manner. The manner may be consistent with the manner of sending the uplink signal on the terminal device side. In this way, the DMRS is not discarded in the received uplink signal, and it is ensured that the PUSCH can be correctly transmitted.

According to a sixth aspect, this application provides a communications method.

In a possible design, the method may include: A network device sends first indication information and second indication information to a terminal device, where the first indication information indicates the terminal device to send a first signal on a first uplink carrier in a first time period, and the second indication information indicates the terminal device to send a second signal on a second uplink carrier in a second time period, where if the first time period is before the second time period, a priority of the second signal is higher than a priority of the first signal, and the network device receives another symbol in the first signal other than a first symbol on the first uplink carrier in the first time period, and receives the second signal on the second uplink carrier in the second time period; or if the first time period is after the second time period, a priority of the first signal is higher than a priority of the second signal, and the network device receives the first signal on the first uplink carrier in the first time period, and receives another symbol in the second signal other than a second symbol on the second uplink carrier in the second time period, where the first time period and the second time period are adjacent in terms of time, and the second signal is a physical uplink shared channel PUSCH. In this implementation, the network device determines a manner of receiving an uplink signal based on a sequence of the first time period and the second time period. The manner may be consistent with a manner of sending the uplink signal on the terminal device side. In this way, a DMRS is not discarded in the received uplink signal, and it is ensured that the PUSCH can be correctly transmitted.

With reference to the fifth aspect and the sixth aspect, in a possible design, if the second signal includes an additional demodulation reference signal, the second symbol is the $1^{st}$ symbol in the second signal, and the network device receives the first signal on the first uplink carrier in the first time period, and receives another symbol in the second signal other than the $1^{st}$ symbol on the second uplink carrier in the second time period; or if the second signal includes no additional demodulation reference signal, the second symbol is all symbols in the second signal, and the network device receives the first signal on the first uplink carrier in the first time period.

With reference to the fifth aspect and the sixth aspect, in a possible design, if there is a potential terminal jointly scheduled with the terminal device, the second symbol is all symbols in the second signal, and the network device receives the first signal on the first uplink carrier in the first time period; or if there is no potential terminal jointly scheduled with the terminal device, the second symbol is the $1^{st}$ symbol in the second signal other than a demodulation reference signal, or is the last symbol in the second signal, and the network device receives the first signal on the first uplink carrier in the first time period, and receives the another symbol in the second signal other than the second symbol on the second uplink carrier in the second time period.

Correspondingly, this application further provides a communications apparatus, and the apparatus may implement the communications method according to the fifth aspect or the sixth aspect. For example, the apparatus may be a network device or a chip used in a network device, or may be another apparatus that can implement the foregoing communications method. The apparatus may implement the foregoing method by using software, hardware, or hardware executing corresponding software.

In a possible design, the apparatus may include a processor and a memory. The processor is configured to support the apparatus in performing a corresponding function in the method according to the fifth aspect and/or the sixth aspect. The memory is configured to couple to the processor, and store a program instruction and data that are for the apparatus. In addition, the apparatus may further include a communications interface, configured to support communication between the apparatus and another apparatus. The communications interface may be a transceiver or a transceiver circuit.

In a possible design, the apparatus may include a sending module and a receiving module. The sending module is configured to send first indication information and second indication information to a terminal device, where the first indication information indicates the terminal device to send a first signal on a first uplink carrier in a first time period, the second indication information indicates the terminal device to send a second signal on a second uplink carrier in a second time period, the first time period and the second time period are adjacent in terms of time, and the second signal is a physical uplink shared channel PUSCH; and the receiving module is configured to receive, when a first reference signal configuration manner is used for the second signal, another symbol in the first signal other than a first symbol on the first uplink carrier in the first time period, and receive the second signal on the second uplink carrier in the second time period, where a priority of the second signal is higher than a priority of the first signal.

In a possible design, the receiving module is further configured to receive, when a second reference signal configuration manner is used for the second signal, the first signal on the first uplink carrier in the first time period, and receive another symbol in the second signal other than a second symbol on the second uplink carrier in the second time period, where the priority of the first signal is higher than the priority of the second signal.

In another possible design, the apparatus may include a sending module and a receiving module. The sending module is configured to send first indication information and second indication information to a terminal device, where the first indication information indicates the terminal device to send a first signal on a first uplink carrier in a first time period, the second indication information indicates the terminal device to send a second signal on a second uplink carrier in a second time period, the first time period and the second time period are adjacent in terms of time, and the second signal is a physical uplink shared channel PUSCH; the receiving module is configured to receive, when the first time period is before the second time period, another symbol in the first signal other than a first symbol on the first uplink carrier in the first time period, and receive the second signal on the second uplink carrier in the second time period, where a priority of the second signal is higher than a priority of the first signal; and the receiving module is further configured to receive, when the first time period is after the second time period, the first signal on the first uplink carrier in the first time period, and receive another symbol in the second signal other than a second symbol on the second uplink carrier in the second time period, where the priority of the first signal is higher than the priority of the second signal.

In a possible design, if the second signal includes an additional demodulation reference signal, the second symbol is the $1^{st}$ symbol in the second signal, and the receiving module is specifically configured to receive the first signal on the first uplink carrier in the first time period, and receive another symbol in the second signal other than the $1^{st}$ symbol on the second uplink carrier in the second time period; or if the second signal includes no additional demodulation reference signal, the second symbol is all symbols in the second signal, and the receiving module is specifically configured to receive the first signal on the first uplink carrier in the first time period.

In a possible design, if there is a potential terminal jointly scheduled with the terminal device, the second symbol is all symbols in the second signal, and the receiving module is specifically configured to receive the first signal on the first uplink carrier in the first time period; or if there is no potential terminal jointly scheduled with the terminal device, the second symbol is the $1^{st}$ symbol in the second signal other than a demodulation reference signal, or is the last symbol in the second signal, and the receiving module is specifically configured to receive the first signal on the first uplink carrier in the first time period, and receive the another symbol in the second signal other than the second symbol on the second uplink carrier in the second time period.

With reference to any one of the foregoing aspects, in a possible design, the first reference signal configuration manner is that a demodulation reference signal is configured on the $1^{st}$ symbol on the PUSCH.

With reference to any one of the foregoing aspects, in a possible design, the second reference signal configuration manner is that a demodulation reference signal is configured on the third symbol or the fourth symbol on the PUSCH.

With reference to any one of the foregoing aspects, in a possible design, the first signal is a physical uplink control channel (PUCCH).

Technical solutions provided in this application may be used in various communications systems including an uplink carrier switching scenario, for example, a current 5G NR system, a future evolved system, or a plurality of communications convergence system. There may be a plurality of application scenarios that may include scenarios such as machine to machine (M2M), device to machine (D2M), macro-micro communication, enhanced mobile broadband (eMBB), ultra-reliable and low-latency communication (uRLLC), and massive machine-type communications (mMTC). The scenarios may include but are not limited to a scenario of communication between terminal devices, a scenario of communication between network devices, a scenario of communication between a network device and a terminal device, and the like.

This application further provides a computer program product including an instruction. When the computer program product runs on a computer, the computer is enabled to perform the method according to any one of the foregoing aspects.

This application further provides a chip system. The chip system includes a processor, may further include a memory, and is configured to implement the method according to any one of the foregoing aspects.

This application provides a communications system. The system includes the foregoing apparatus configured to implement the communications method according to the first aspect, the second aspect, the third aspect, or the fourth aspect and the foregoing apparatus configured to implement the communications method according to the fifth aspect or the sixth aspect.

Any apparatus, computer storage medium, computer program product, chip system, or communications system provided above is configured to perform the corresponding method provided above. Therefore, for beneficial effects that can be achieved by the apparatus, computer storage medium, computer program product, chip system, or communications system provided above, refer to beneficial effects of a corresponding solution in the corresponding method provided above. Details are not described herein again.

DESCRIPTION OF EMBODIMENTS

The following describes in detail a communications method and apparatus provided in the embodiments of this application with reference to the accompanying drawings.

Technical solutions provided in this application may be used in various communications systems including an uplink carrier switching scenario, for example, a current 5G NR system, a future evolved system, or a plurality of communications convergence system. There may be a plurality of application scenarios that may include scenarios such as machine to machine (M2M), D2M, macro-micro communication, enhanced mobile broadband (eMBB), ultra-reliable and low-latency communication (uRLLC), and massive machine-type communications (mMTC). The scenarios may include but are not limited to a scenario of communication between terminal devices, a scenario of communication between network devices, a scenario of communication between a network device and a terminal device, and the like.

Figure 1:
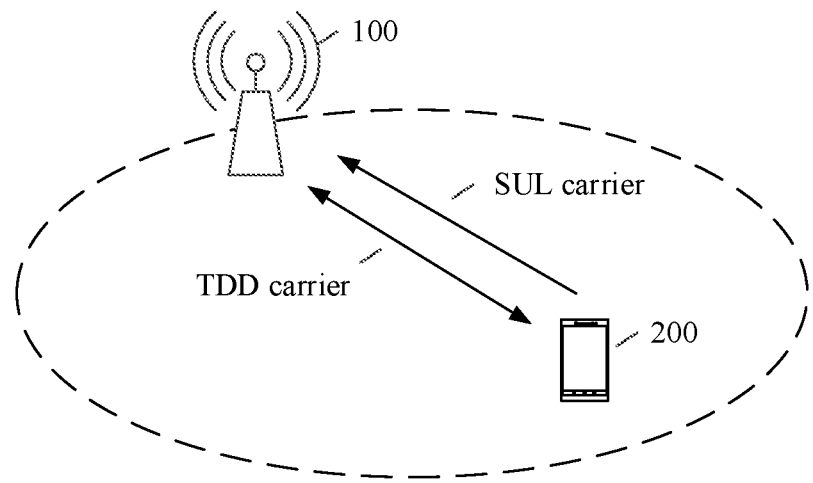
FIG. 1 is a schematic diagram 1 of a system architecture to which a technical solution according to an embodiment of this application is applicable.

The technical solutions provided in the embodiments of this application may be used in a system architecture shown in FIG. 1. The system architecture may include a network device 100 and one or more terminal devices 200 connected to the network device 100.

The network device 100 may be a device that can communicate with the terminal device 200. The network device 100 may be an NB (NodeB) in a wideband code division multiple access (WCDMA) system, may be an eNB or an eNodeB (evolutional NodeB) in a long term evolution (LTE) system, or may be a node in a 5G mobile communications system. The 5G node may be an access node, a generation NodeB (gNB), a transmission reception point (TRP), a transmission point (TP), or another access node. Alternatively, the network device 100 may be a radio controller in a cloud radio access network (CRAN) scenario, may be a network device, a relay station, or an access point in a future evolved public land mobile network (PLMN) network, or may be a wearable device, a vehicle-mounted device, or the like.

The terminal device 200 may be an access terminal, a user equipment (UE) unit, a UE station, a mobile station, a mobile station, a remote station, a remote terminal, a mobile device, a UE terminal, a terminal, a wireless communications device, a UE agent, a UE apparatus, a virtual reality terminal device, an augmented reality terminal device, a wireless terminal in industry control, or the like. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a future evolved PLMN network, or the like.

The terminal device 200 and the network device 100 may perform uplink and downlink communication by using a TDD carrier, or may perform uplink communication by using at least one SUL carrier. To be specific, there may be two or more uplink carriers for uplink communication between the network device and the terminal device, and the two or more uplink carriers correspond to one downlink carrier. Carrier frequencies of the two or more uplink carriers between the terminal device 200 and the network device 100 are different from each other. It should be noted that, the SUL carrier may be a carrier independently used by an NR system, or may be an uplink carrier shared by an NR system and the LTE system. When sending an uplink signal, the terminal device 200 may switch between the TDD carrier and the at least one SUL carrier.

It should be noted that the system architecture shown in FIG. 1 is merely used as an example, and is not intended to limit the technical solutions in this application. A person skilled in the art should understand that in a specific implementation process, the system architecture may further include another device, for example, a core network device. In addition, quantities of the network devices 100 and the terminal devices 200 may be configured based on a specific requirement.

The communications method and apparatus provided in the embodiments of this application may be used in a terminal device. The terminal device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, in the embodiments of this application, a specific structure of an execution body of the communications method is not particularly limited in the embodiments of this application, provided that a program that records code of the communications method in the embodiments of this application can be run to perform communication according to the communications method in the embodiments of this application. For example, the execution body of the communications method in the embodiments of this application may be a terminal device, a function module that is in a terminal device and that can invoke and execute the program, or a communications apparatus used in a terminal device, for example, a chip. This is not limited in this application.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD) and a digital versatile disc (DVD)), and a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, contain, and/or carry an instruction and/or data.

Figure 2:
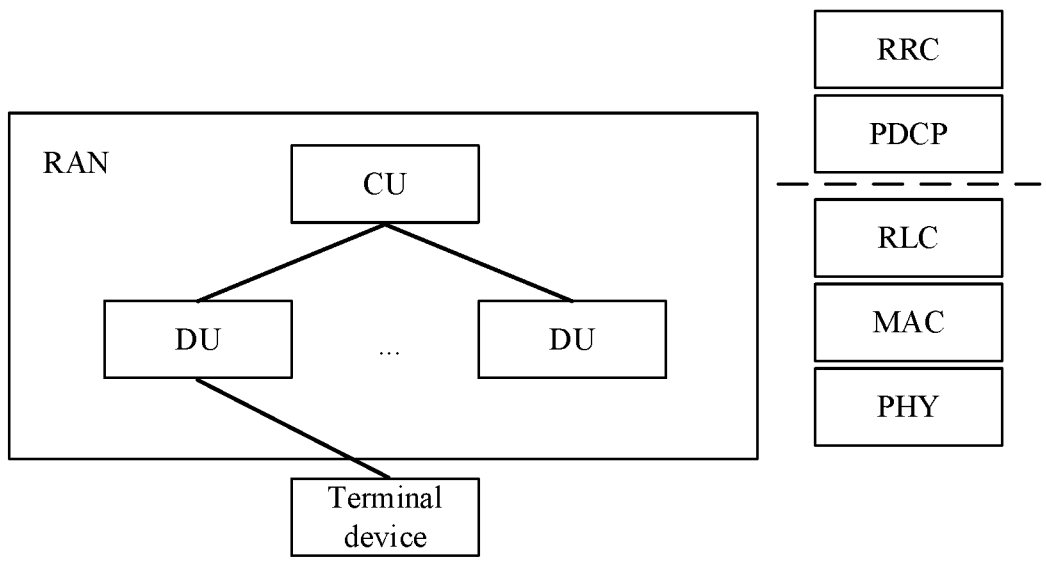
FIG. 2 is a schematic diagram 2 of a system architecture to which a technical solution according to an embodiment of this application is applicable.

A future access network may be implemented by using a cloud radio access network (C-RAN) architecture. Therefore, in a possible manner, a protocol stack architecture and a function of a conventional base station are divided into two parts: One part is referred to as a central unit (CU), and the other part is referred to as a distributed unit (DU). A manner of actually deploying the CU and the DU is relatively flexible. For example, CU parts of a plurality of base stations are integrated together to form a function entity with a relatively large scale. FIG. 2 is a schematic diagram of a network architecture according to an embodiment of this application. As shown in FIG. 2, the network architecture includes an access network (a radio access network (RAN) is used as an example) device and a terminal device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communications system, a RAN device eNodeB (eNB) includes a baseband apparatus and a radio frequency apparatus. The radio frequency apparatus may be remotely arranged relative to the baseband apparatus (for example, a radio remote unit (RRU) is remotely arranged relative to a baseband unit (BBU)). The RAN device is implemented by one node, and the node is configured to implement functions of protocol layers such as a radio resource control (RRC) layer, a packet data convergence protocol (PDCP) layer, a radio link control (RLC) layer, and a media access control (MAC) layer. For another example, in an evolved structure, the baseband apparatus may include a CU and DUs, and the plurality of DUs may be controlled by the CU in a centralized manner. As shown in FIG. 2, the CU and the DUs may be divided based on the protocol layers of a wireless network. For example, functions of the packet data convergence protocol layer and a protocol layer above the packet data convergence protocol layer are set on the CU, and functions of protocol layers, for example, the RLC layer and the MAC layer, below the PDCP layer are set on the DUs.

Division based on the protocol layer is merely an example, and division may alternatively be performed based on another protocol layer such as the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, division is performed based on a latency. A function whose processing time needs to meet a latency requirement is set on the DU, and a function whose processing time does not need to meet the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
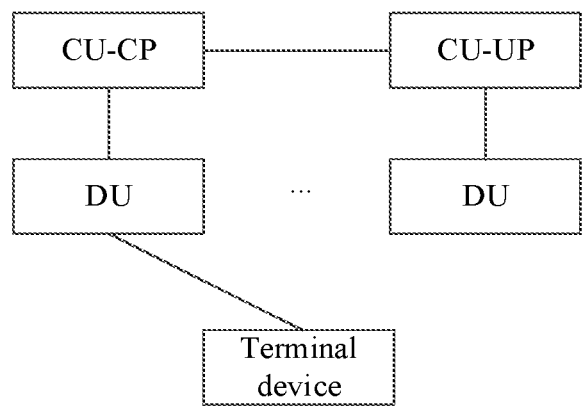
FIG. 3 is a schematic diagram 3 of a system architecture to which a technical solution according to an embodiment of this application is applicable.

In addition, referring to FIG. 3, compared with the architecture shown in FIG. 2, in an architecture, a control plane (CP) and a user plane (UP) of a CU may alternatively be separated into different entities for implementation, and the different entities are a control plane CU entity (CU-CP entity) and a user plane CU entity (CU-UP entity).

In the foregoing network architecture, signaling/data generated by the CU may be sent to a terminal device by using DUs, or signaling/data generated by a terminal device may be sent to the CU by using the DUs. The DUs may not parse the signaling/data, but directly encapsulate the signaling/data by using a protocol layer and transparently transmits the signaling/data to the terminal device or the CU. In the following embodiments, if transmission of the signaling/data between the DUs and the terminal device is described, sending or receiving the signaling/data by the DUs is applicable to the scenario. For example, signaling of an RRC or a PDCP layer is finally processed as signaling/data of a physical layer (PHY) and sent to the terminal device, or is converted from received signaling/data of a PHY layer. In this architecture, it may also be considered that the signaling/data of the RRC layer or the PDCP layer is sent by the DUs, or is sent by the DUs and a radio frequency apparatus.

In the foregoing embodiment, the CU is classified as a network device in a RAN. In addition, the CU may alternatively be classified as a network device in a core network. This is not limited herein.

The apparatus in the following embodiments of this application may be located in a terminal device or a network device based on a function implemented by the apparatus. When the foregoing CU-DU structure is used, the network device may be a CU node, a DU node, or a RAN device including functions of a CU node and a DU node.

In this application, the foregoing communications method may be performed by the network device and the terminal device, or may be performed by an apparatus used in the network device and the terminal device, for example, a chip, or another apparatus for implementing the foregoing communications method. This is not limited in the embodiments of this application. In this specification, an example in which the foregoing communications method is performed by the network device and the terminal device is used for description.

The following explains and describes some terms in this application.

1. Uplink Signal

The uplink signal sent by the terminal device to the network device may include a data signal, a control signal, a preamble sequence signal, and a measurement signal. The data signal is carried on a physical uplink shared channel (PUSCH), the control signal (Uplink Control Information, UCI) is carried on a physical uplink control channel (PUCCH), the preamble sequence signal is carried on a physical random access channel (PRACH), and the measurement signal includes a sounding reference signal (SRS). Specifically, the UCI may include acknowledgment feedback information (namely, ACK/NACK), channel state information (CSI), and the like.

2. Reference Signal Configuration Manner

When sending the PUSCH to the network device, the terminal device further transmits a demodulation reference signal (DMRS). A reference signal configuration manner may include:

First reference signal configuration manner: The DMRS is configured on the $1^{st}$ symbol on the PUSCH. For example, the first reference signal configuration manner may be a type B PUSCH in an NR system.

Second reference signal configuration manner: The DMRS is configured on a symbol on the PUSCH other than the $1^{st}$ symbol. For example, the second reference signal configuration manner may be a type A PUSCH in the NR system, and the DMRS is configured on the third symbol or the fourth symbol on the PUSCH, or the DMRS is configured on the third symbol or the fourth symbol in a slot.

In addition, the PUSCH may further include an additional DMRS, and the additional DMRS is a DMRS configured at a location of another symbol on the PUSCH other than locations of the symbols in the first reference signal configuration manner and the second reference signal configuration manner.

3. The term "a plurality of" in this specification means two or more. In this specification, the terms "first" and "second" are intended to distinguish between different objects but do not indicate a particular order of the objects. For example, a first time period and a second time period are merely used to distinguish between different time periods, and a sequence of the first time period and the second time period is not limited. The term "and/or" in this specification describes only an association relationship for describing associated objects and represents that three relationships may exist. For example, A and/or B may represent the following three cases: Only A exists, both A and B exist, and only B exists.

In the embodiments of this application, the word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" or the like is intended to present a relative concept in a specific manner.

Figure 4:
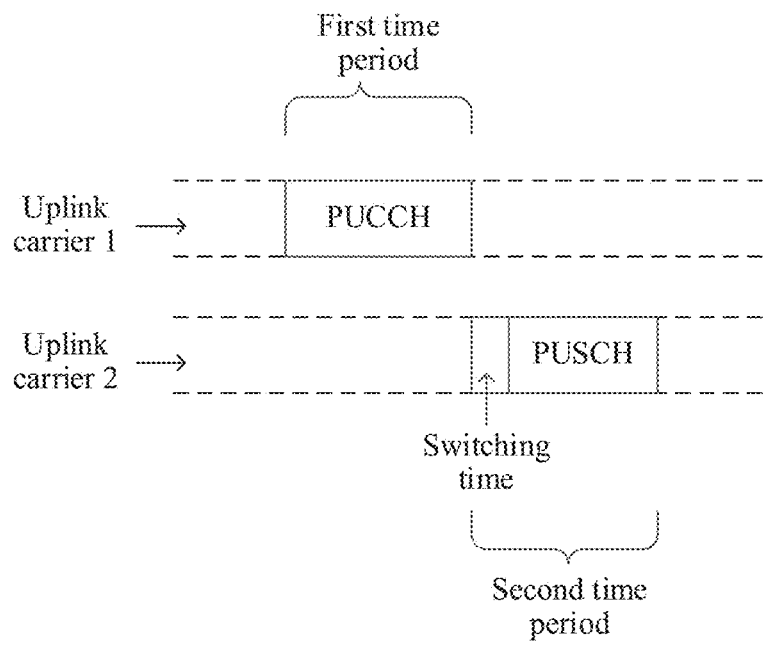
FIG. 4 is a schematic diagram of a method for determining a location of a symbol to be discarded in the prior art.

There are a plurality of uplink carriers between the terminal device and the network device. The terminal device may switch between different uplink carriers when sending the uplink signal to the network device. If the terminal device uses a same radio frequency loop on two uplink carriers, and a carrier frequency difference between the two uplink carriers is relatively large, the terminal device needs a switching time such as 20 microseconds to implement switching between the two uplink carriers. The terminal device needs to reserve the time for switching when switching between the two uplink carriers that share the radio frequency. For example, the terminal device may discard one or more consecutive symbols, so that adjustment of a working frequency of the radio frequency loop can be completed within a time occupied by the discarded symbol. For example, as shown in FIG. 4, the terminal device sends the uplink signal PUCCH to the network device on an uplink carrier 1 in the first time period, and switches to sending the uplink signal PUSCH to the network device on an uplink carrier 2 in the second time period. The last one or more consecutive symbols on a previous carrier may be discarded, or the first one or more consecutive symbols on a next carrier may be discarded, and the adjustment of the working frequency of the radio frequency loop is completed within the time occupied by the discarded symbol. Whether to discard the last one or more consecutive symbols on the previous carrier or to discard the first one or more consecutive symbols on the next carrier may be determined based on priorities of sending uplink signals on the two uplink carriers. For example, a priority of the PRACH is higher than that of the PUCCH, the priority of the PUCCH is higher than that of the PUSCH, and the priority of the PUSCH is higher than that of the SRS. Then, in the case shown in FIG. 4, the priority of the PUCCH is higher than that of the PUSCH. The $1^{st}$ symbol on the PUSCH may be discarded, and a time occupied by the $1^{st}$ symbol on the PUSCH is used as a switching time for switching between the two uplink carriers. If the reference signal configuration manner is the first reference signal configuration manner, to be specific, the DMRS is configured on the $1^{st}$ symbol on the PUSCH, the DMRS is discarded. Consequently, the network device cannot receive the DMRS, channel estimation cannot be performed, and therefore, the PUSCH cannot be correctly demodulated. That is, transmission of the PUSCH fails.

Figure 5:
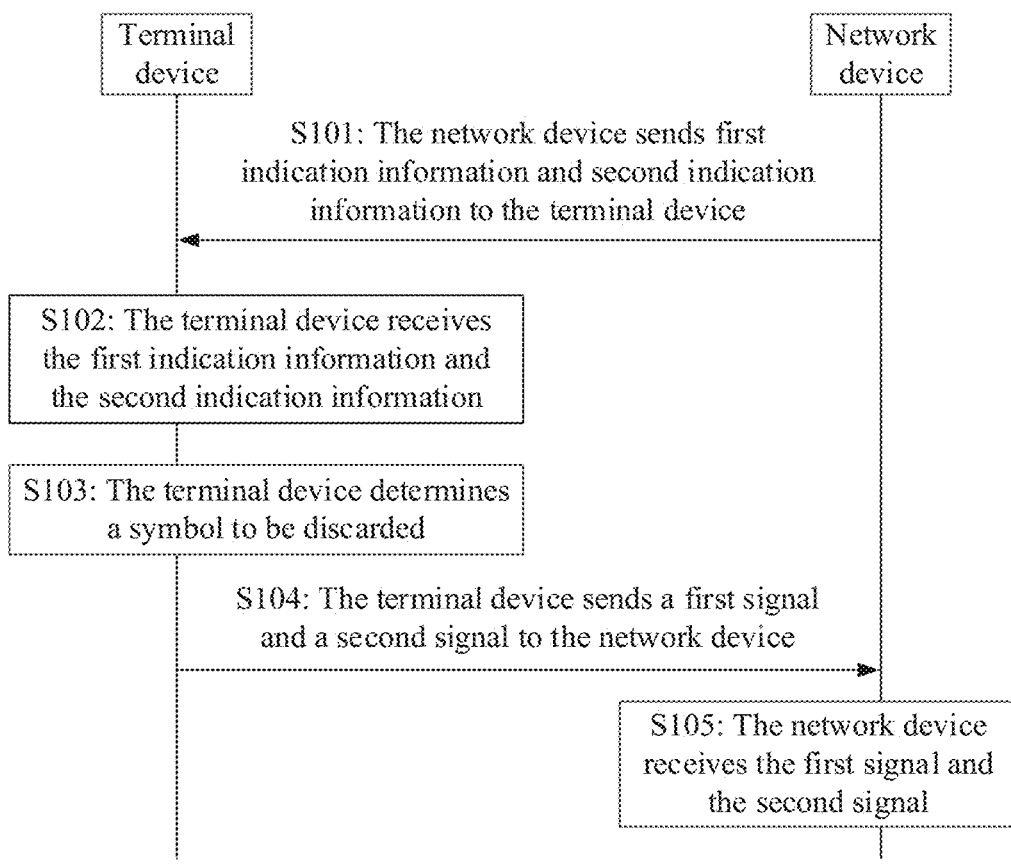
FIG. 5 is a schematic diagram 1 of a communications method according to an embodiment of this application.

An embodiment of this application provides a communications method. The method may be used in the communications systems shown in FIG. 1 to FIG. 3. In a process of uplink carrier switching, a DMRS can be prevented from being discarded, and it is ensured that a PUSCH is correctly transmitted. As shown in FIG. 5, the method may include S101 to S105:

S101: A network device sends first indication information and second indication information to a terminal device.

Specifically, the first indication information indicates the terminal device to send a first signal on a first uplink carrier in a first time period, and the second indication information indicates the terminal device to send a second signal on a second uplink carrier in a second time period. The first time period and the second time period are adjacent in terms of time, and the first time period is before the second time period, or the first time period is after the second time period. Duration of the first time period and the second time period may be equal, or may be not equal. This is not limited in this embodiment of this application.

For example, the first time period and the second time period may be two adjacent slots. In an NR system, a slot includes 14 orthogonal frequency division multiplexing (OFDM) symbols, and an absolute time length of the slot is related to a subcarrier spacing of the OFDM symbol. For example, a slot length corresponding to a subcarrier spacing of 15 kHz is 1 ms, and a slot length corresponding to a subcarrier spacing of 30 kHz is 0.5 ms.

Optionally, the first uplink carrier and the second uplink carrier are any two uplink carriers that share one radio frequency loop and that are in a plurality of uplink carriers between the network device and the terminal device. Optionally, the first uplink carrier is the TDD carrier in FIG. 1, and the second uplink carrier is the SUL carrier in FIG. 1. Optionally, the first uplink carrier and the second uplink carrier may be two uplink carriers that belong to a same cell, or may be uplink carriers that belong to different cells. For example, the first uplink carrier and the second uplink carrier may be two uplink carriers that use carrier aggregation, or may be two uplink carriers that use dual connectivity.

The first signal is an uplink signal sent on the first uplink carrier, and the second signal is an uplink signal sent on the second uplink carrier. For example, the first signal is a PUCCH, and the second signal is a PUSCH. For example, the first signal is a PRACH, and the second signal is a PUSCH. Alternatively, the first signal and the second signal may be sounding reference signals or other types of uplink signals. In this embodiment of this application, an example in which the first signal is the PUCCH and the second signal is the PUSCH is used for description. Types of the first signal and the second signal are not limited in this embodiment of this application.

Figure 6A:
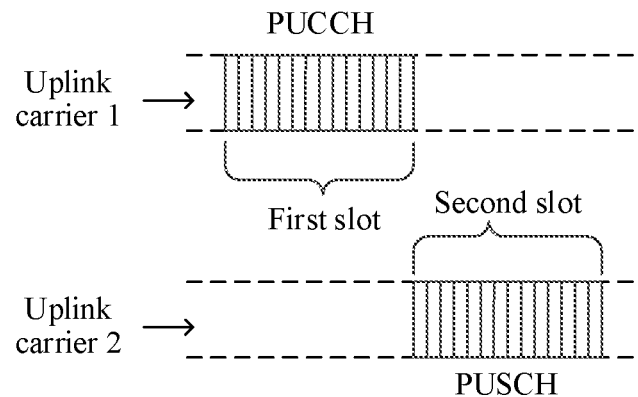
FIG. 6*a* and FIG. 6*b* are schematic diagrams 1 and 2 of a scenario to which a communications method according to an embodiment of this application is applicable.
Figure 6B:
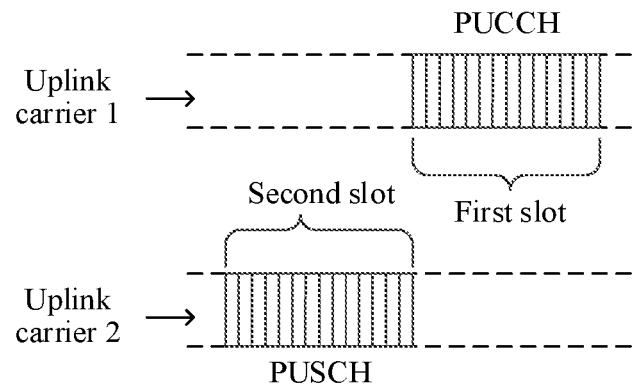

For example, the first indication information indicates the terminal device to send the PUCCH on an uplink carrier 1 in a first slot, and the second indication information indicates the terminal device to send the PUSCH on an uplink carrier 2 in a second slot. If the first time period is before the second time period, the case is shown in FIG. 6a; or if the first time period is after the second time period, the case is shown in FIG. 6b.

In an implementation, the first indication information and the second indication information may be sent by the network device to the terminal device through downlink control information (DCI). Usually, the first indication information is carried in DCI used for scheduling downlink transmission, for example, a DCI format 1_0 or a DCI format 1_1 in the NR system, and the second indication information is carried in DCI used for scheduling uplink transmission, for example, a DCI format 0_0 or a DCI format 0_1 in the NR system. In other words, the first indication information and the second indication information are separately sent by the network device to the terminal device through different messages. It should be noted that, in this embodiment of this application, it is not limited to that the first indication information and the second indication information are separately carried in the different messages, and the first indication information and the second indication information may alternatively be sent by the network device to the terminal device through a same message.

S102: The terminal device receives the first indication information and the second indication information.

S103: The terminal device determines a symbol to be discarded.

In an implementation, after receiving the first indication information and the second indication information, the terminal device determines, based on the first indication information, the first signal to be sent on the first uplink carrier in the first time period, and determines, based on the second indication information, the second signal to be sent on the second uplink carrier in the second time period. For example, the terminal device determines to send the PUCCH on the uplink carrier 1 in the first slot, and determines to send the PUSCH on the uplink carrier 2 in the second slot. If the first time period is before the second time period, as shown in FIG. 6a, the terminal device sends the PUCCH on the uplink carrier 1 in the first slot, and sends the PUSCH on the uplink carrier 2 in the second slot subsequently; or if the first time period is after the second time period, as shown in FIG. 6b, the terminal device sends the PUSCH on the uplink carrier 2 in the second slot, and sends the PUCCH on the uplink carrier 1 in the first slot subsequently.

Optionally, the terminal device may determine, based on priorities of the first signal and the second signal, the symbol to be discarded. For example, whether the last one or more consecutive symbols in a previous time period or the first one or the first several consecutive symbols in a next time period are discarded may be determined based on the priorities of the first signal and the second signal.

In a possible design, when a first reference signal configuration manner is used for the second signal, a priority of the second signal is higher than a priority of the first signal, and the terminal device determines that a first symbol in the first signal is to be discarded; or when a second reference signal configuration manner is used for the second signal, a priority of the first signal is higher than a priority of the second signal, and the terminal device determines that a second symbol in the second signal is to be discarded.

Figure 7A:
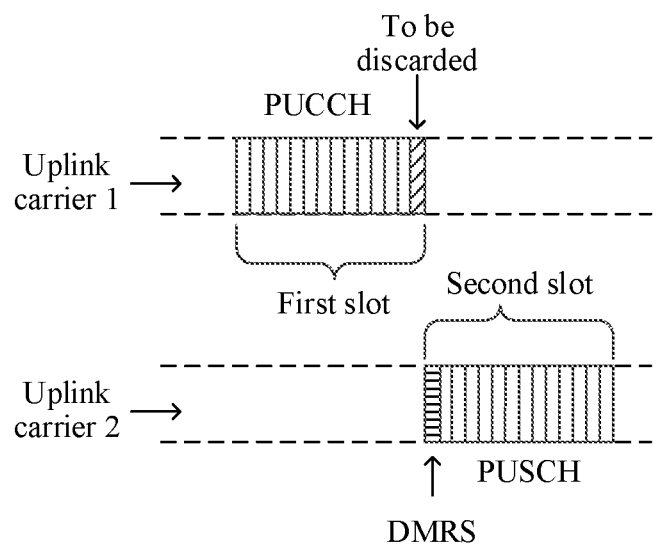
FIG. 7*a* to FIG. 7*d* are schematic diagrams 1, 2, 3, 4, 5 and 6 of a communications method according to an embodiment of this application.
Figure 7B:
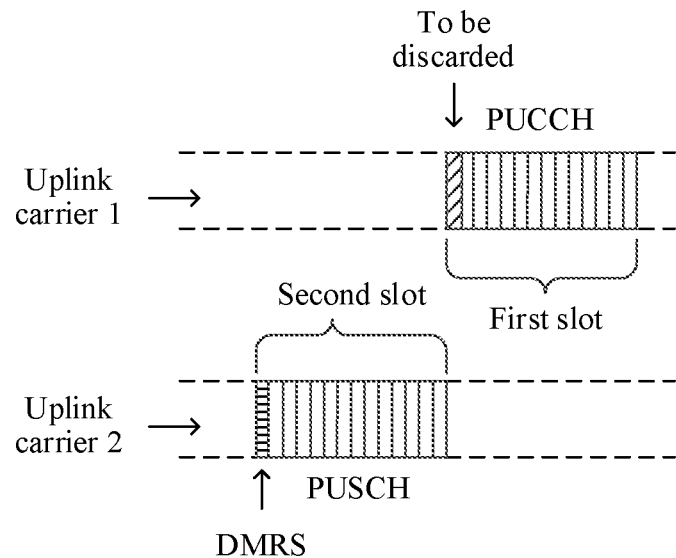
Figure 7B:
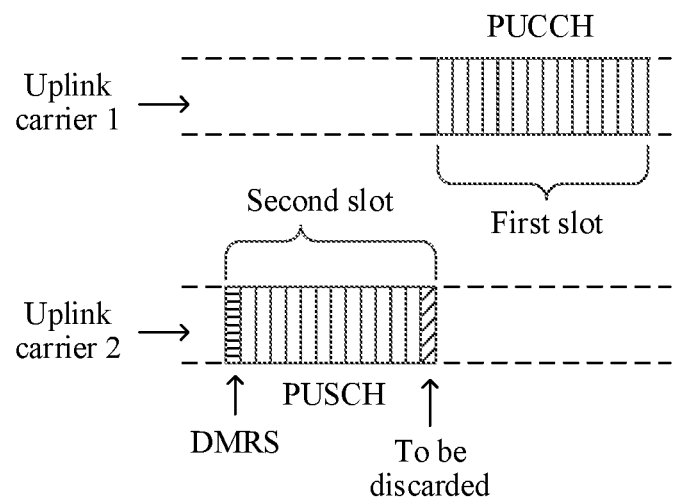

For example, as shown in FIG. 7a and FIG. 7b, the first signal is the PUCCH, the second signal is the PUSCH, and the first reference signal configuration manner is used for the second signal. Specifically, the DMRS is configured on the $1^{st}$ symbol on the PUSCH. A priority of the PUSCH is higher than a priority of the PUCCH, and the terminal device determines that the first symbol on the PUCCH is to be discarded. For example, in FIG. 7a, the symbol determined to be discarded is the last symbol on the PUCCH in the first slot, and in FIG. 7b, the symbol determined to be discarded is the $1^{st}$ symbol on the PUCCH in the first slot.

Figure 7C:
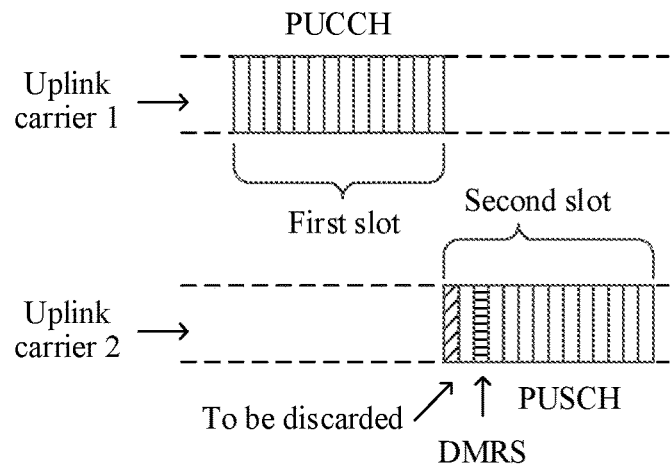
Figure 7C:
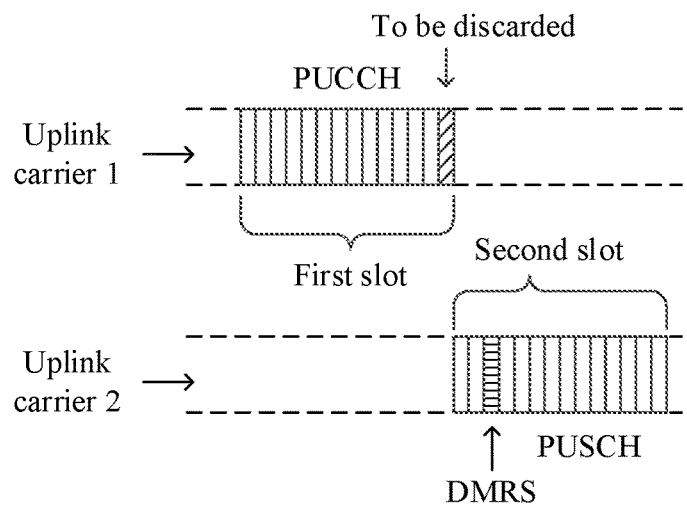
Figure 7D:
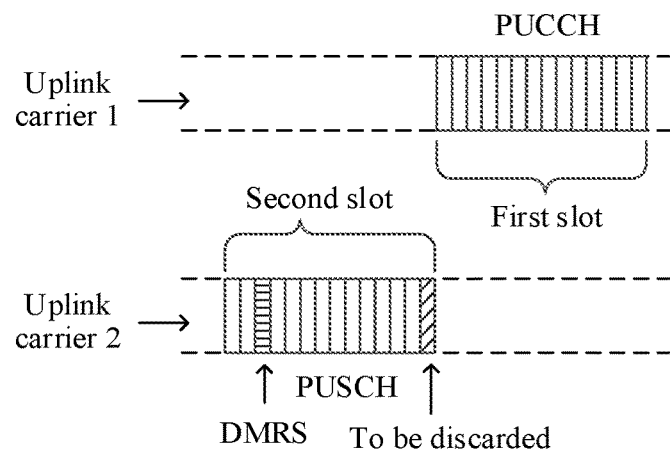

For example, as shown in FIG. 7c and FIG. 7d, the first signal is the PUCCH, the second signal is the PUSCH, and the second reference signal configuration manner is used for the second signal. Specifically, the DMRS is configured on the third symbol or the fourth symbol on the PUSCH. That the DMRS is configured on the third symbol on the PUSCH is used as an example, a priority of the PUCCH is higher than a priority of the PUSCH, and the terminal device determines that the second symbol on the PUSCH is to be discarded. For example, in FIG. 7c, the symbol determined to be discarded is the $1^{st}$ symbol on the PUSCH in the second slot, and in FIG. 7d, the symbol determined to be discarded is the last symbol on the PUSCH in the second slot.

It can be learned that in this implementation, a location of the symbol determined to be discarded does not include a location at which the DMRS is configured.

In another possible design, if the first time period is before the second time period, the priority of the second signal is higher than the priority of the first signal, and the terminal device determines that a first symbol in the first signal is to be discarded; or if the first time period is after the second time period, a priority of the first signal is higher than a priority of the second signal, and the terminal device determines that a second symbol in the second signal is to be discarded.

For example, as shown in FIG. 7a and FIG. 7c', the first signal is the PUCCH, the second signal is the PUSCH, and the first slot is before the second slot. A priority of the PUSCH is higher than a priority of the PUCCH, and the terminal device determines that the last symbol on the PUCCH in the first slot is to be discarded.

For example, as shown in FIG. 7b' and FIG. 7d, the first slot is after the second slot, a priority of the PUCCH is higher than a priority of the PUSCH, and the terminal device determines that the last symbol on the PUSCH in the second slot is to be discarded.

It can be learned that in this implementation, a location of the symbol determined to be discarded does not include a location at which the DMRS is configured.

In another possible design, when the first reference signal configuration manner is used for the second signal, if the first time period is before the second time period, a priority of the second signal is higher than a priority of the first signal, and the terminal device determines that a first symbol in the first signal is to be discarded; or if the first time period is after the second time period, a priority of the first signal is higher than a priority of the second signal, and the terminal device determines that a second symbol in the second signal is to be discarded.

For example, as shown in FIG. 7a and FIG. 7b', the first signal is the PUCCH, the second signal is the PUSCH, and the first reference signal configuration manner is used for the second signal. Specifically, the DMRS is configured on the $1^{st}$ symbol on the PUSCH. If the first slot is before the second slot, as shown in FIG. 7a, a priority of the PUSCH is higher than a priority of the PUCCH, and the terminal device determines that the last symbol on the PUCCH in the first slot is to be discarded; or if the first slot is after the second slot, as shown in FIG. 7b', the priority of the PUCCH is higher than the priority of the PUSCH, and the terminal device determines that the last symbol on the PUSCH in the second slot is to be discarded.

When the second reference signal configuration manner is used for the second signal, the priority of the first signal is higher than the priority of second signal.

For example, as shown in FIG. 7c and FIG. 7d, the first signal is the PUCCH, the second signal is the PUSCH, and the second reference signal configuration manner is used for the second signal. Specifically, the DMRS is configured on the third symbol or the fourth symbol on the PUSCH. That the DMRS is configured on the third symbol on the PUSCH is used as an example, the priority of the PUCCH is higher than the priority of the PUSCH, and the terminal device determines that the second symbol on the PUSCH is to be discarded. For example, in FIG. 7c, the symbol determined to be discarded is the $1^{st}$ symbol on the PUSCH in the second slot, and in FIG. 7d, the symbol determined to be discarded is the last symbol on the PUSCH in the second slot.

It can be learned that in this implementation, a location of the symbol determined to be discarded does not include a location at which the DMRS is configured.

Further, in an implementation, if the first signal does not include acknowledgment feedback information, the priorities of the first signal and the second signal may be determined by using any one of the foregoing implementations; or if the first signal includes acknowledgment feedback information, the priorities of the first signal and the second signal may be determined in a manner in the prior art, for example, the priority of the PUCCH is higher than the priority of the PUSCH.

Specifically, when an uplink signal is the PUCCH, the PUCCH may include the acknowledgment feedback information, CSI, and the like. For example, if it is determined that the PUCCH does not include the acknowledgment feedback information, for example, the PUCCH includes only the CSI, the priorities of the first signal and the second signal may be determined by using any one of the foregoing implementations, to determine the symbol to be discarded; or if it is determined that the PUCCH includes the acknowledgment feedback information, it is determined that priority of the PUCCH is higher than the priority of the PUSCH.

S104: The terminal device sends the first signal and the second signal to the network device.

If determining that the first symbol in the first signal is to be discarded, the terminal device sends another symbol in the first signal other than the first symbol and the second signal to the network device; or if determining that the second symbol in the second signal is to be discarded, the terminal device sends the first signal and another symbol in the second signal other than the second symbol to the network device. Determining that a symbol is to be discarded indicates that when sending the uplink signal to the network device, the terminal device does not send a corresponding uplink signal at a location of the symbol. When one or more symbols in the uplink signal are not sent, a time occupied by the symbol can be used to complete adjustment of a working frequency of a radio frequency loop.

For example, the terminal device determines that the first symbol in the first signal is to be discarded. As shown in FIG. 7a and FIG. 7c', the terminal device determines that the last symbol on the PUCCH in the first slot is to be discarded, sends the PUCCH to the network device in a time occupied by the first to the thirteenth symbols in the first slot, and sends the PUSCH to the network device in a time occupied by all symbols in the second slot; and as shown in FIG. 7b, the terminal device determines that the $1^{st}$ symbol on the PUCCH in the first slot is to be discarded, sends the PUSCH to the network device in the time occupied by all the symbols in the second slot, and sends the PUCCH to the network device in a time occupied by the second to the fourteenth symbols in the first slot.

For example, the terminal device determines that the second symbol in the second signal is to be discarded. As shown in FIG. 7b' and FIG. 7d, the terminal device determines that the last symbol on the PUSCH in the second slot is to be discarded, sends the PUSCH to the network device in a time occupied by the first to the thirteenth symbols in the second slot, and sends the PUCCH to the network device in a time occupied by all symbols in the first slot; and as shown in FIG. 7c, the terminal device determines that the $1^{st}$ symbol on the PUSCH in the second slot is to be discarded, sends the PUCCH to the network device in the time occupied by all the symbols in the first slot, and sends the PUSCH to the network device in a time occupied by the second to the fourteenth symbols in the second slot.

Further, when the second symbol in the second signal is to be discarded, only one symbol in the second signal may be to be discarded, or all symbols in the second signal may be to be discarded.

In a possible implementation, if the second signal includes an additional demodulation reference signal, the second symbol is the $1^{st}$ symbol in the second signal, and the terminal device sends the first signal and another symbol in the second signal other than the $1^{st}$ symbol to the network device. For example, as shown in FIG. 7c, if the PUSCH in FIG. 7c includes the additional DMRS, for example, the additional DMRS is configured at a location of the seventh symbol on the PUSCH, the second symbol to be discarded is the $1^{st}$ symbol on the PUSCH, the terminal device sends the PUCCH to the network device in the time occupied by all the symbols in the first slot, and sends the PUSCH to the network device in the time occupied by the second to the fourteenth symbols in the second slot.

If the second signal includes no additional demodulation reference signal, the second symbol is all the symbols in the second signal, and the terminal device sends the first signal to the network device. For example, if the PUSCH includes no additional DMRS, the second symbol to be discarded is all symbols on the PUSCH, and the terminal device sends the PUCCH to the network device in the time occupied by all the symbols in the first slot.

In another implementation, if there is a potential terminal jointly scheduled with the terminal device, the second symbol is all the symbols in the second signal, and the terminal device sends the first signal to the network device. For example, the terminal device only sends the PUCCH to the network device in the time occupied by all the symbols in the first slot.

If there is no potential terminal jointly scheduled with the terminal device, the second symbol is the $1^{st}$ symbol in the second signal other than the demodulation reference signal, or is the last symbol in the second signal, and the terminal device sends the first signal and the another symbol in the second signal other than the second symbol to the network device.

Figure 8A:
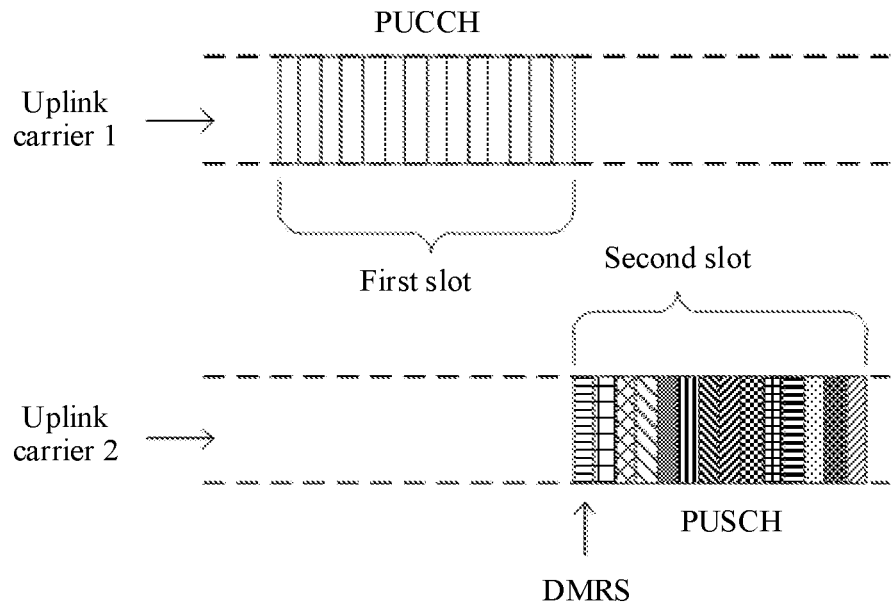
FIG. 8*a* to FIG. 8*c* are schematic diagrams 7, 8, and 9 of a communications method according to an embodiment of this application.
Figure 8B:
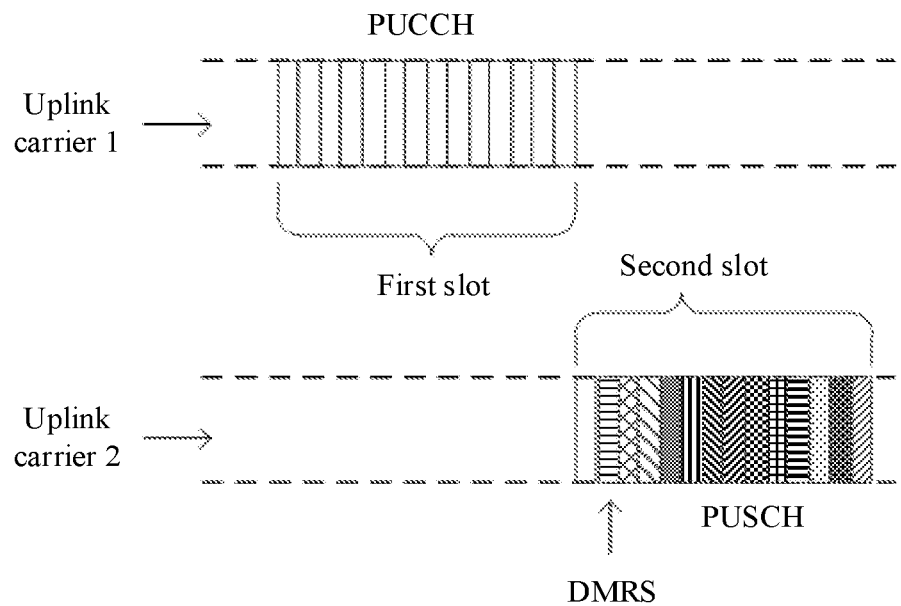
Figure 8C:
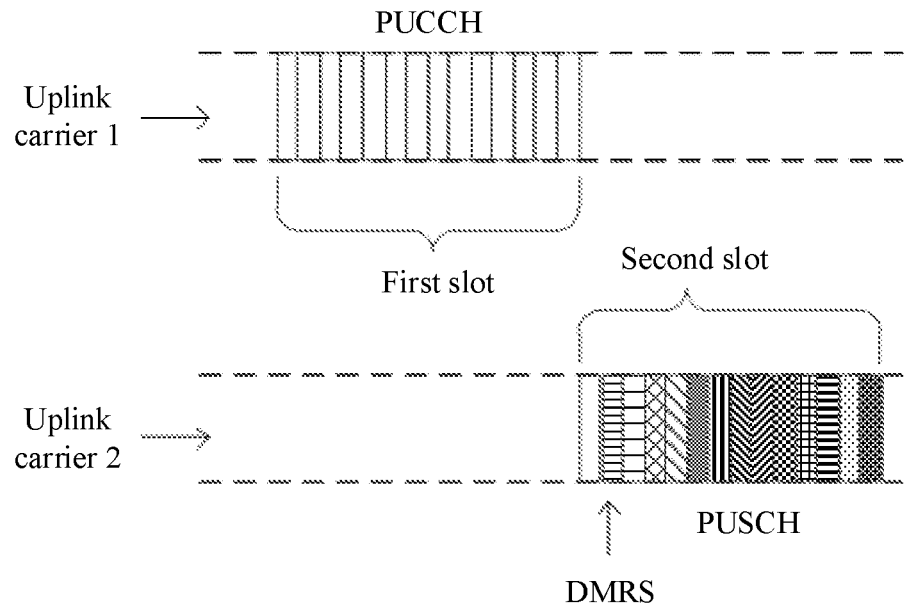

For example, as shown in FIG. 8a, the first signal is the PUCCH, the second signal is the PUSCH, the first slot is before the second slot, and the DMRS is configured at the $1^{st}$ symbol on the PUSCH. In a possible implementation, if there is no potential terminal jointly scheduled with the terminal device, the terminal device determines to discard the $1^{st}$ symbol in the second signal other than the demodulation reference signal, that is, discard the $2^{nd}$ symbol on the PUSCH, and maps the DMRS to a location of the $2^{nd}$ symbol on the PUSCH. As shown in FIG. 8b, the terminal device sends the PUCCH to the network device in the time occupied by all the symbols in the first slot, and sends the PUSCH to the network device in a time occupied by the second to the fourteenth symbols in the second slot. In another possible implementation, if there is no potential terminal jointly scheduled with the terminal device, the terminal device determines to discard the last symbol in the second signal, and separately delays transmission of the first to the thirteenth symbols on the PUSCH duration of one symbol. As shown in FIG. 8c, the terminal device sends the PUCCH to the network device in the time occupied by all the symbols in the first slot, and sends the PUSCH to the network device in the time occupied by the second to the fourteenth symbols in the second slot.

S105: The network device receives the first signal and the second signal.

If the priority of the second signal is higher than the priority of the first signal, the network device receives the another symbol in the first signal other than the first symbol on the first uplink carrier in the first time period, and receives the second signal on the second uplink carrier in the second time period. If the priority of the first signal is higher than the priority of the second signal, the network device receives the first signal on the first uplink carrier in the first time period, and receives the another symbol in the second signal other than the second symbol on the second uplink carrier in the second time period.

A method of determining, by the network device, the priorities of the first signal and the second signal is the same as the method of determining, on the terminal device side, the priorities of the first signal and the second signal, and a method of determining, by the network device, the location of the symbol to be discarded is the same as the method of determining, on the terminal device side, the location of the symbol to be discarded. For the specific determining methods, refer to the determining methods on the terminal device side in S103 and S104. Details are not described herein again.

For example, if the priority of the second signal is higher than the priority of the first signal, the terminal device sends the PUCCH to the network device in the time occupied by the first to the thirteenth symbols in the first slot, and sends the PUSCH to the network device in the time occupied by all the symbols in the second slot; and the network device receives the PUCCH in the time occupied by the first to the thirteenth symbols in the first slot, and receives the PUSCH in the time occupied by all the symbols in the second slot. If the priority of the first signal is higher than the priority of the second signal, the terminal device sends the PUCCH to the network device in the time occupied by all symbols in the first slot, and sends the PUSCH to the network device in the time occupied by the second to the fourteenth symbols in the second slot; and the network device receives the PUCCH in the time occupied by all the symbols in the first slot, and receives the PUSCH in the time occupied by the second to the fourteenth symbols in the second slot.

According to the communications method provided in this embodiment of this application, in the process of switching between the different uplink carriers, when priorities of different uplink signals are determined and the location of the symbol to be discarded is determined, a location at which the DMRS is configured is considered. Compared with a method, in the prior art, in which the priorities of the different uplink signals are fixed without considering the location at which the DMRS is configured, in the communications method provided in this embodiment of this application, when the priorities of the different uplink signals and the location of the symbol to be discarded are determined, the location at which the DMRS is configured is considered, to prevent the DMRS from being discarded in the process of switching between the different uplink carriers, and ensure that the PUSCH can be correctly transmitted.

It should be noted that in the foregoing embodiment, discarding symbols means that the symbols are not sent. The discarded symbols are symbols that originally need to be sent, but due to a limitation of an objective condition, the terminal cannot send the signals. In addition, the discarded symbol may also be understood as a symbol whose transmit power is 0. During actual implementation, the terminal device may not determine the first signal and the second signal that are to be sent, determine the priorities of the first signal and the second signal, and determine the location of the symbol to be discarded. Instead, when sending the first signal and the second signal, the terminal device does not send the uplink signal at the corresponding location of the symbol to be discarded.

Figure 9:
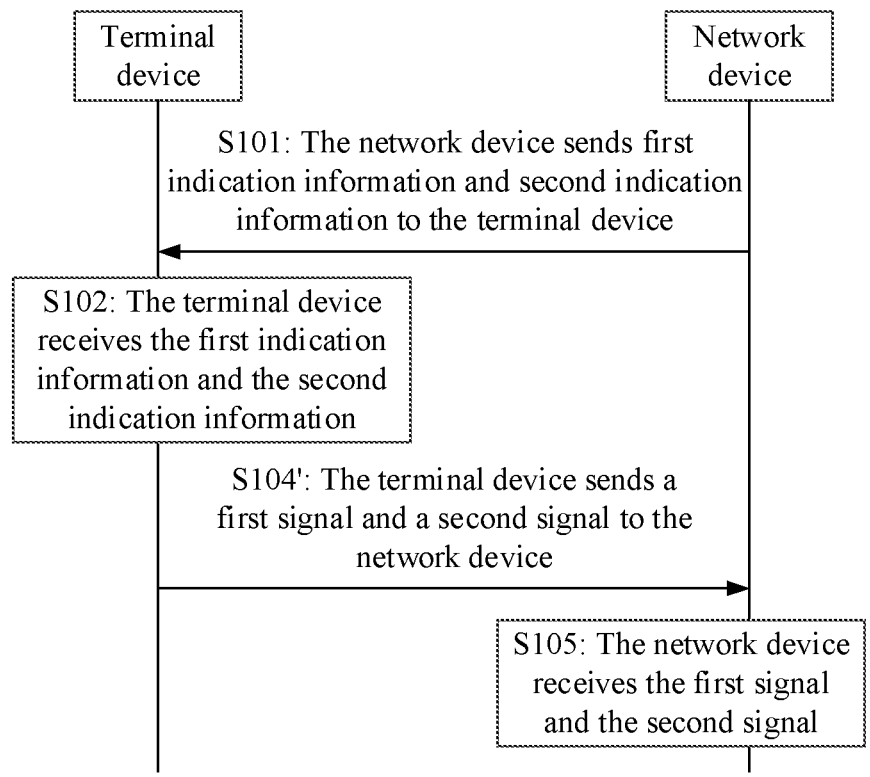
FIG. 9 is a schematic diagram 2 of a communications method according to an embodiment of this application.

In another implementation, as shown in FIG. 9, a communications method provided in this embodiment of this application may include S101, S102, S104', and S105. S101, S102, and S105 are the same as S101, S102, and S105 in FIG. 5. Details are not described herein again. The following describes only S104'.

S104': The terminal device sends the first signal and the second signal to the network device.

In an implementation, the terminal device determines to send, when the first reference signal configuration manner is used for the second signal, the another symbol in the first signal other than the first symbol and the second signal; and the terminal device determines to send, when the second reference signal configuration manner is used for the second signal, the first signal and the another symbol in the second signal other than the second symbol.

For example, as shown in FIG. 7a and FIG. 7b, the first signal is the PUCCH, the second signal is the PUSCH, and the first reference signal configuration manner is used for the second signal. Specifically, the DMRS is configured on the 1$^{st}$ symbol on the PUSCH, and another symbol on the PUCCH other than the first symbol and the PUSCH are sent. For example, in FIG. 7a, the terminal device may send the PUCCH to the network device in the time occupied by the first to the thirteenth symbols in the first slot, and send the PUSCH to the network device in the time occupied by all the symbols in the second slot; and in FIG. 7b, the terminal device sends the PUSCH to the network device in the time occupied by all the symbols in the second slot, and sends the PUCCH to the network device in the time occupied by the second to the fourteenth symbols in the first slot.

For example, as shown in FIG. 7c and FIG. 7d, the first signal is the PUCCH, the second signal is the PUSCH, and the second reference signal configuration manner is used for the second signal. Specifically, the DMRS is configured on the third symbol or the fourth symbol on the PUSCH. That the DMRS is configured on the third symbol on the PUSCH is used as an example, the PUCCH and another symbol on the PUSCH other than the second symbol are sent. For example, in FIG. 7c, the terminal device sends the PUCCH to the network device in the time occupied by all the symbols in the first slot, and sends the PUSCH to the network device in the time occupied by the second to the fourteenth symbols in the second slot; and in FIG. 7d, the terminal device sends the PUSCH to the network device in the time occupied by the first to the thirteenth symbols in the second slot, and sends the PUCCH to the network device in the time occupied by all the symbols in the first slot. In another implementation, if determining that the first time period is before the second time period, the terminal device sends the another symbol in the first signal other than the first symbol and the second signal; or if determining that the first time period is after the second time period, the terminal device sends the first signal and the another symbol in the second signal other than the second symbol.

For example, as shown in FIG. 7a and FIG. 7c', the first signal is the PUCCH, the second signal is the PUSCH, and the first slot is before the second slot. The terminal device sends the PUCCH to the network device in the time occupied by the first to the thirteenth symbols in the first slot, and sends the PUSCH to the network device in the time occupied by all the symbols in the second slot.

For example, as shown in FIG. 7b' and FIG. 7d, the first slot is after the second slot, the terminal device sends the PUSCH to the network device in the time occupied by the first to the thirteenth symbols in the second slot, and sends the PUCCH to the network device in the time occupied by all the symbols in the first slot.

In another implementation, the terminal device determines to send, when the first reference signal configuration manner is used for the second signal, if the first time period is before the second time period, the another symbol in the first signal other than the first symbol and the second signal; or if determining that the first time period is after the second time period, the terminal device sends the first signal and the another symbol in the second signal other than the second symbol. The terminal device determines to send, when the second reference signal configuration manner is used for the second signal, the first signal and the another symbol in the second signal other than the second symbol.

For example, as shown in FIG. 7a and FIG. 7b', the first signal is the PUCCH, the second signal is the PUSCH, and the first reference signal configuration manner is used for the second signal. Specifically, the DMRS is configured on the 1$^{st}$ symbol on the PUSCH. If the first slot is before the second slot, as shown in FIG. 7a, the terminal device may send the PUCCH to the network device in the time occupied by the first to the thirteenth symbols in the first slot, and send the PUSCH to the network device in the time occupied by all the symbols in the second slot; or if the first slot is after the second slot, as shown in FIG. 7b', the terminal device sends the PUSCH to the network device in the time occupied by the first to the thirteenth symbols in the second slot, and sends the PUCCH to the network device in the time occupied by all the symbols in the first slot.

For example, as shown in FIG. 7c and FIG. 7d, the first signal is the PUCCH, the second signal is the PUSCH, and the second reference signal configuration manner is used for the second signal. Specifically, the DMRS is configured on the third symbol or the fourth symbol on the PUSCH. That the DMRS is configured on the third symbol on the PUSCH is used as an example. For example, in FIG. 7c, the terminal device sends the PUCCH to the network device in the time occupied by all the symbols in the first slot, and sends the PUSCH to the network device in the time occupied by the second to the fourteenth symbols in the second slot; and in FIG. 7d, the terminal device sends the PUSCH to the network device in the time occupied by the first to the thirteenth symbols in the second slot, and sends the PUCCH to the network device in the time occupied by all the symbols in the first slot.

Further, in an implementation, if the first signal does not include the acknowledgment feedback information, an uplink signal may be sent by using any one of the foregoing implementations; or if the first signal includes the acknowledgment feedback information, an uplink signal may be sent in a manner in the prior art.

Further, when the first signal and the another symbol in the second signal other than the second symbol are sent, the second symbol may be a symbol in the second signal, or may be all the symbols in the second signal.

In a possible implementation, if the second signal includes an additional demodulation reference signal, the second symbol is the $1^{st}$ symbol in the second signal, and the terminal device sends the first signal and another symbol in the second signal other than the $1^{st}$ symbol to the network device. For example, as shown in FIG. 7c, if the PUSCH in FIG. 7c includes the additional DMRS, for example, the additional DMRS is configured at a location of the seventh symbol on the PUSCH, the terminal device sends the PUCCH to the network device in the time occupied by all the symbols in the first slot, and sends the PUSCH to the network device in the time occupied by the second to the fourteenth symbols in the second slot.

If the second signal includes no additional demodulation reference signal, the second symbol is all the symbols in the second signal, and the terminal device sends the first signal to the network device. For example, if the PUSCH includes no additional DMRS, the terminal device sends the PUCCH to the network device in the time occupied by all the symbols in the first slot.

In another implementation, if there is a potential terminal jointly scheduled with the terminal device, the second symbol is all the symbols in the second signal, and the terminal device sends the first signal to the network device. For example, the terminal device only sends the PUCCH to the network device in the time occupied by all the symbols in the first slot.

If there is no potential terminal jointly scheduled with the terminal device, the second symbol is the $1^{st}$ symbol in the second signal other than the demodulation reference signal, or is the last symbol in the second signal, and the terminal device sends the first signal and the another symbol in the second signal other than the second symbol to the network device.

For example, as shown in FIG. 8a, the first signal is the PUCCH, the second signal is the PUSCH, the first slot is before the second slot, and the DMRS is configured at the $1^{st}$ symbol on the PUSCH. In a possible implementation, if there is no potential terminal jointly scheduled with the terminal device, the terminal device maps the DMRS to a location of the $2^{nd}$ symbol on the PUSCH. As shown in FIG. 8b, the terminal device sends the PUCCH to the network device in the time occupied by all the symbols in the first slot, and sends the PUSCH to the network device in the time occupied by the second to the fourteenth symbols in the second slot. In another possible implementation, if there is no potential terminal jointly scheduled with the terminal device, the terminal device separately delays transmission of the first to the thirteenth symbols on the PUSCH duration of one symbol. As shown in FIG. 8c, the terminal device sends the PUCCH to the network device in the time occupied by all the symbols in the first slot, and sends the PUSCH to the network device in the time occupied by the second to the fourteenth symbols in the second slot.

According to the communications method provided in this embodiment of this application, in the process of switching between the different uplink carriers, when sending uplink signals based on priorities of the uplink signals, the location at which the DMRS is configured is considered. Compared with the method, in the prior art, in which the priorities of the different uplink signals are fixed without considering the location at which the DMRS is configured, in the communications method provided in this embodiment of this application, the location at which the DMRS is configured is considered when the uplink signals are sent, to prevent the DMRS from being discarded in the process of switching between the different uplink carriers, and ensure that the PUSCH can be correctly transmitted.

The foregoing mainly describes the solutions provided in the embodiments of this application from a perspective of interaction between the network device and the terminal device. It may be understood that to implement the foregoing functions, the network device and the terminal device include corresponding hardware structures and/or software modules for implementing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into function modules may be performed on the network device and the terminal device based on the foregoing method examples. For example, each function module may be obtained through division corresponding to each function, or two or more functions may be integrated into one processing module. The foregoing integrated module may be implemented in a form of hardware, or may be implemented in a form of a software functional module. It should be noted that in the embodiments of this application, division into the modules is an example and is merely logical function division, and may be other division during actual implementation. An example in which function modules are divided based on functions is used below for description.

Figure 10:
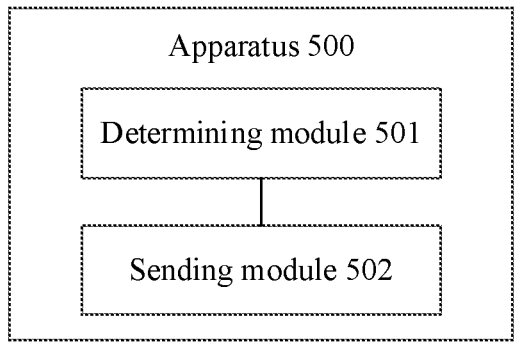
FIG. 10 is a schematic structural diagram 1 of a communications apparatus according to an embodiment of this application.

FIG. 10 is a schematic diagram of a logical structure of an apparatus 500 according to an embodiment of this application. The apparatus 500 may be a terminal device, and can implement a function of the terminal device in the method provided in the embodiments of this application. Alternatively, the apparatus 500 may be an apparatus that can support a terminal device in implementing a function of the terminal device in the method provided in the embodiments of this application. The apparatus 500 may be a hardware structure, a software module, or a combination of a hardware structure and a software module. The apparatus 500 may be implemented by a chip system. In this embodiment of this application, the chip system may include a chip, or may include a chip and another discrete component. As shown in FIG. 10, the apparatus 500 includes a determining module 501 and a sending module 502. The determining module 501 may be configured to perform S103 in FIG. 5, and/or perform another step described in this application. The sending module 502 may be configured to perform S104 in FIG. 5 or S104' in FIG. 9, and/or perform another step described in this application. The determining module may also be referred to as a determining unit or another name, and the sending module may also be referred to as a sending unit or another name.

All related content of the steps in the foregoing method embodiments may be cited in function descriptions of corresponding function modules. Details are not described herein again.

Figure 11:
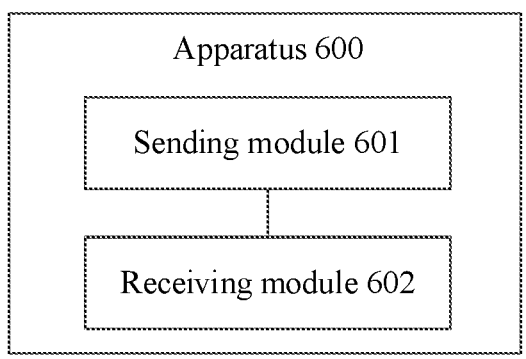
FIG. 11 is a schematic structural diagram 2 of a communications apparatus according to an embodiment of this application.

FIG. 11 is a schematic diagram of a logical structure of an apparatus 600 according to an embodiment of this application. The apparatus 600 may be a network device, and can implement a function of the network device in the method provided in the embodiments of this application. Alternatively, the apparatus 600 may be an apparatus that can support a network device in implementing a function of the network device in the method provided in the embodiments of this application. The apparatus 600 may be a hardware structure, a software module, or a combination of a hardware structure and a software module. As shown in FIG. 11, the network device 600 includes a sending module 601 and a receiving module 602. The sending module 601 may be configured to perform S101 in FIG. 5 or S101 in FIG. 9, and/or perform another step described in this application. The receiving module 602 may be configured to perform S105 in FIG. 5 or S105 in FIG. 9, and/or perform another step described in this application. The sending module may also be referred to as a sending unit or another name, and the receiving module may also be referred to as a receiving unit or another name.

All related content of the steps in the foregoing method embodiments may be cited in function descriptions of corresponding function modules. Details are not described herein again.

In the embodiments, the apparatus 500 or the apparatus 600 may be presented in a form of function modules obtained through division in an integrated manner. The "module" herein may be a specific ASIC, a circuit, a processor and a storage device that execute one or more software or firmware programs, an integrated logic circuit, and/or another component that can provide the foregoing functions.

Figure 12:
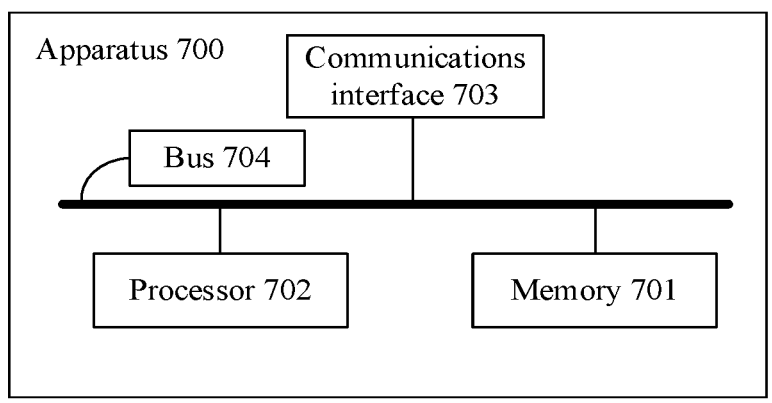
FIG. 12 is a schematic structural diagram 3 of a communications apparatus according to an embodiment of this application.

In a possible implementation, the apparatus 500 or the apparatus 600 may be in a form shown in FIG. 12.

As shown in FIG. 12, an apparatus 700 may include a memory 701, a processor 702, and a communications interface 703. The memory 701 is configured to store an instruction. When the apparatus 700 runs, the processor 702 executes the instruction stored in the memory 701, so that the apparatus 700 performs the communications method provided in the embodiments of this application. The memory 701, the processor 702, and the communications interface 703 communicate and are connected by using a bus 704. For a specific communications method, refer to the foregoing descriptions and related descriptions in the accompanying drawings. Details are not described herein again. It should be noted that, in a specific implementation process, the apparatus 700 may further include other hardware components, which are not enumerated one by one in this specification. In a possible implementation, the memory 701 may be included in the processor 702.

In an example of this application, the determining module 501 in FIG. 10 may be implemented by using the processor 702, and the sending module 502 in FIG. 10 or the sending module 601 or the receiving module 602 in FIG. 11 may be implemented by using the communications interface 703.

The communications interface 703 may be a circuit, a component, an interface, a bus, a software module, a transceiver, or any other apparatus that can implement communication. For example, the processor 702 may be a field-programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip. The memory 701 includes a volatile memory, for example, a random-access memory (RAM). The memory may also include a non-volatile memory, for example, a flash memory, a hard disk drive (HDD), or a solid-state drive (SSD). The memory may further include a combination of the foregoing types of memories. The memory may further include any other apparatus having a storage function, for example, a circuit, a device, or a software module.

The apparatus provided in this embodiment of this application may be configured to perform the foregoing communications method. Therefore, for technical effects that can be obtained by the apparatus, refer to the foregoing method embodiments. Details are not described herein again.

A person of ordinary skill in the art may understand that all or some of the steps of the foregoing method may be implemented by a program instructing relevant hardware. The program may be stored in a computer-readable storage medium. The computer-readable storage medium is, for example, a ROM, a RAM, and an optical disc.

An embodiment of this application further provides a storage medium. The storage medium may include the memory 701.

For explanations and beneficial effects of related content in any one of the foregoing provided apparatuses, refer to the corresponding method embodiment provided above. Details are not described herein again.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, the word "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope defined by the following claims of this application and their equivalent technologies.

What is claimed is:

1. A communications method, comprising:
   determining, by a terminal device, a first signal to be sent on a first uplink carrier in a first time period, and determining a second signal to be sent on a second uplink carrier in a second time period, wherein the first time period and the second time period are continuous in time, and the second signal is a physical uplink shared channel (PUSCH), wherein either
   a first reference signal configuration is a demodulation reference signal configured on a $1^{st}$ symbol on the PUSCH and is used for the second signal, a priority of the second signal is higher than a priority of the first signal, the terminal device determines that a first symbol in the first signal is to be discarded, and the terminal device sends another symbol in the first signal other than the first symbol and the second signal to a network device; or
   a second reference signal configuration is used for the second signal, the priority of the first signal is higher than the priority of the second signal, the terminal device determines that a second symbol in the second signal is to be discarded, and the terminal device sends the first signal and another symbol in the second signal other than the second symbol to the network device; and wherein
   if the second signal comprises an additional demodulation reference signal, then the second symbol is a $1^{st}$ symbol in the second signal, and the terminal device sends the first signal and another symbol in the second signal other than the $1^{st}$ symbol to the network device; or
   if the second signal comprises no additional demodulation reference signal, then the second symbol is all symbols in the second signal, and the terminal device sends the first signal to the network device.

2. The communications method according to claim 1, wherein the second reference signal configuration is that a demodulation reference signal is configured on a third symbol or a fourth symbol on the PUSCH.

3. A communications method, comprising:
   sending, by a network device, first indication information and second indication information to a terminal device, wherein the first indication information indicates the terminal device to send a first signal on a first uplink carrier in a first time period, the second indication information indicates the terminal device to send a second signal on a second uplink carrier in a second time period, the first time period and the second time period are continuous in time, and the second signal is a physical uplink shared channel (PUSCH), wherein either
   a first reference signal configuration is a demodulation reference signal configured on a $1^{st}$ symbol on the PUSCH and is used for the second signal, a priority of the second signal is higher than a priority of the first signal, and the network device receives another symbol in the first signal other than a first symbol on the first uplink carrier in the first time period, and receives the second signal on the second uplink carrier in the second time period, or
   a second reference signal configuration is used for the first signal, the priority of the first signal is higher than the priority of the second signal, and the network device receives the first signal on the first uplink carrier in the first time period, and receives another symbol in the second signal other than a second symbol on the second uplink carrier in the second time period; and wherein
   if the second signal comprises an additional demodulation reference signal, then the second symbol is a $1^{st}$ symbol in the second signal, and the network device receives the first signal on the first uplink carrier in the first time period, and receives the other symbol in the second signal other than the $1^{st}$ symbol on the second uplink carrier in the second time period; or
   if the second signal comprises no additional demodulation reference signal, then the second symbol is all symbols in the second signal, and the network device receives the first signal on the first uplink carrier in the first time period.

4. The communications method according to claim 3, wherein the second reference signal configuration is a demodulation reference signal configured on a third symbol or a fourth symbol on the PUSCH.

5. A communications apparatus, comprising:
   a processor and a memory unit storing program instructions;
   wherein, when executed by the processor, the program instructions enable the communication apparatus to perform the following steps:
   determining a first signal to be sent on a first uplink carrier in a first time period, and determining a second signal to be sent on a second uplink carrier in a second time period, wherein the first time period and the second signal is sent immediately after the first signal is sent time period are continuous in time, and the second signal is a physical uplink shared channel (PUSCH); and either
   determining a first symbol in the first signal is to be discarded, when a first reference signal configuration is a demodulation reference signal configured on a $1^{st}$ symbol on the PUSCH and is used for the second signal and wherein a priority of the second signal is higher than a priority of the first signal, and sending another symbol in the first signal other than the first symbol and the second signal to a network device; or determining, that a second symbol in the second signal is to be discarded, when a second reference signal configuration manner is used for the first signal, and wherein the priority of the first signal is higher than the priority of the second signal, and sending the first signal and another symbol in the second signal other than the second symbol to the network device; and wherein if the second signal comprises an additional demodulation reference signal, the second symbol is a $1^{st}$ symbol in the second signal, and the sending process comprises sending the first signal and another symbol in the second signal other than the $1^{st}$ symbol to the network device; or if the second signal comprises no additional demodulation reference signal, the second symbol is all symbols in the second signal, and the sending process comprises sending the first signal to the network device.

6. The communications apparatus according to claim 5, wherein the second reference signal configuration is a demodulation reference signal configured on a third symbol or a fourth symbol on the PUSCH.

7. A communications apparatus, comprising:

a processor and a memory unit storing program instructions;

wherein, when executed by the processor, the program instructions enable the communication apparatus to perform the following steps:

sending first indication information and second indication information to a terminal device, wherein the first indication information indicates to the terminal device to send a first signal on a first uplink carrier in a first time period, the second indication information indicates to the terminal device to send a second signal on a second uplink carrier in a second time period, the first time period and the second time period are continuous adjacent in time, and the second signal is a physical uplink shared channel (PUSCH); and either receiving another symbol in the first signal other than a first symbol on the first uplink carrier in the first time period, and receiving the second signal on the second uplink carrier in the second time period, when a first reference signal configuration is a demodulation reference signal configured on a $1^{st}$ symbol on the PUSCH and is used for the second signal, and wherein a priority of the second signal is higher than a priority of the first signal; or receiving another symbol in the second signal other than a second symbol on the second uplink carrier in the second time period, and receiving the first signal on the first uplink carrier in the first time period, when a second reference signal configuration is used for the first signal, and wherein a priority of the first signal is higher than a priority of the second signal; and wherein if the second signal comprises an additional demodulation reference signal, the second symbol is a $1^{st}$ symbol in the second signal, and the receiving process comprising receiving the first signal on the first uplink carrier in the first time period, and receiving another symbol in the second signal other than the $1^{st}$ symbol on the second uplink carrier in the second time period; or if the second signal comprises no additional demodulation reference signal, the second symbol is all symbols in the second signal, and the receiving process comprising receiving the first signal on the first uplink carrier in the first time period.

8. The communications apparatus according to claim 7, wherein the first reference signal configuration is a demodulation reference signal configured on the $1^{st}$ symbol on the PUSCH.

9. The communications apparatus according to claim 7, wherein the second reference signal configuration is a demodulation reference signal configured on a third symbol or a fourth symbol on the PUSCH.

* * * * *

UNITED STATES PATENT AND TRADEMARK OFFICE
CERTIFICATE OF CORRECTION

PATENT NO. : 12,089,213 B2
APPLICATION NO. : 17/166188
DATED : September 10, 2024
INVENTOR(S) : Xinqian Xie et al.

Page 1 of 1

It is certified that error appears in the above-identified patent and that said Letters Patent is hereby corrected as shown below:

On the Title Page

In item (56), in Column 2, under "Other Publications", Line 3, delete "ChinaJun." and insert
-- China Jun. --.

Signed and Sealed this
Twenty-ninth Day of October, 2024

Katherine Kelly Vidal
*Director of the United States Patent and Trademark Office*